United States Patent [19]

Kawakami et al.

[11] Patent Number: 5,055,114

[45] Date of Patent: Oct. 8, 1991

[54] SEMIPERMEABLE MEMBRANES BASED ON SPECIFIED TETRABROMOBISPHENOL TYPE POLYESTERS

[75] Inventors: James H. Kawakami, Piscataway; Natarajan Muruganandam, Somerville; George L. Brode, Bridgewater, all of N.J.

[73] Assignee: Union Carbide Industrial Gases Technology Corporation, Danbury, Conn.

[21] Appl. No.: 443,207

[22] Filed: Dec. 6, 1989

Related U.S. Application Data

[63] Continuation-in-part of Ser. No. 358,631, May 30, 1989, abandoned, which is a continuation-in-part of Ser. No. 289,668, Dec. 27, 1988, abandoned.

[51] Int. Cl.$^5$ ............................................. B01D 69/00
[52] U.S. Cl. ........................................ 55/16; 55/158; 210/490; 210/500.28
[58] Field of Search ........................... 55/16, 68, 158; 210/490, 500.28

[56] References Cited

U.S. PATENT DOCUMENTS

| | | | |
|---|---|---|---|
| Re. 30,351 | 7/1980 | Hoehn et al. | 55/16 |
| 3,388,097 | 6/1968 | Cramer et al. | 260/47 |
| 3,822,202 | 7/1974 | Hoehn | 210/23 |
| 3,899,309 | 8/1975 | Hoehn et al. | 29/16 |
| 4,818,254 | 4/1989 | Anano et al. | 55/158 X |
| 4,822,382 | 4/1989 | Nelson | 55/16 |

FOREIGN PATENT DOCUMENTS

| | | |
|---|---|---|
| 0242147 | 10/1987 | European Pat. Off. . |
| 0244126 | 11/1987 | European Pat. Off. . |
| 53-66880 | 6/1978 | Japan . |

OTHER PUBLICATIONS

L. A. Pilato et al., Polymers for Permselective Membrane Gas Separations, Amer. Chem. Soc. Div. Polym. Chem., Polym. Prepr., 16(2) (1975) 41-46.

*Primary Examiner*—Frank Spear
*Attorney, Agent, or Firm*—Alvin H. Fritschler

[57] ABSTRACT

Permeable membranes comprised predominantly of specifically defined tetrabromobisphenols and aromatic dicarboxylic acids. The invention also pertains to the novel permeation processes for recovery of an oxygen/nitrogen or carbon dioxide/methane component form a mixture of said component with other components.

34 Claims, No Drawings

SEMIPERMEABLE MEMBRANES BASED ON SPECIFIED TETRABROMOBISPHENOL TYPE POLYESTERS

This application is a continuation-in-part of application Serial No. 358,631, filed May 30, 1989; which was a continuation-in-part of application Serial No. 289,668, filed Dec. 27, 1988, both now abandoned.

FIELD OF THE INVENTION

This invention relates to semipermeable membranes of polyesters of tetrabromobisphenol and aromatic dicarboxylic acids as the predominant nuclei components of the polyester. The invention also relates to processes using said membranes for the selective permeation of at least one component from a fluid mixture containing said one component in admixture with other components, in particular for oxygen/nitrogen, and carbon dioxide/methane separations.

DESCRIPTION OF THE PRIOR ART

Permeable membranes capable of selectively permeating one component of a fluid mixture, either liquid or gas, are considered in the art as a convenient, potentially highly advantageous means for achieving fluid separations. For practical commercial operations, permeable membranes must be capable of achieving an acceptable level of selectivity or separation of the gases or liquids contained in the fluids feed stream while, at the same time, achieving a desirably high productivity, or rate, of component separation.

Various types of permeable, or semipermeable, membranes are known in the art for carrying out a variety of fluid separations. Such membranes have been classified as being of the isotropic, or homogeneous, or composite, or asymmetric types and their structures are well known to those skilled in this art.

As the advantages of permeable and semipermeable membranes have become increasingly appreciated, the performance requirements have likewise increased and the drive to find new membranes for more applications has continued to grow. These demands have resulted in the art moving in the direction of very thin membranes having desired permeability characteristics without sacrifice of the separation, or selectivity, characteristics of the membrane, or of the permeation rate, or productivity, of separation achievable.

At the current time permeable membranes are known that are made from a wide variety of materials, e.g. natural and synthetic polymers such as rubbers, polysiloxanes, polyamines, brominated polyphenylene oxide, cellulose acetate, ethyl cellulose, polyethylene, polypropylene, polybutadiene, polyisoprene, polystyrene, the polyvinyls, polyesters, polyimides, polyamides, the polycarbonates, and a host of other materials.

The following table shows the published diameters of a few of the various gases commonly separated with polymeric membranes.

| Gas | He | $H_2$ | $CO_2$ | $O_2$ | $N_2$ | $CH_4$ |
|---|---|---|---|---|---|---|
| Diameter (Angstrom) | 2.6 | 2.89 | 3.3 | 3.46 | 3.64 | 3.8 |

In the case of oxygen and nitrogen the size difference is rather small, therefore, most polymeric membranes used commercially to separate nitrogen from oxygen have molecular structures that impede the flow of the gases, e.g., such as oxygen, through the membrane. For that reason these polymeric membranes need to be extremely thin, generally about 200 to about 10,000 Angstroms thick, preferably less than 2,000 Angstroms, to make the separation economically viable. The thinner membrane allows faster transport of the permeate through the membrane.

Technology and physical factors limit how thin one can prepare the membrane film or the coating of a composite membrane, thus it would be advantageous to develop new membrane polymers which have higher permeation rates without greatly sacrificing their ability to separate the desired gas mixtures. However the large body of gas permeability coefficients and gas separation data in the literature (e.g., Polymer Handbook, 2nd ed. John Wiley & Sons, 1975) generally shows that increasing the permeability of gases, such as oxygen, by varying the polymer structure, decreases the latter's separation characteristics, the ability to separate oxygen from nitrogen. The data also shows that with the current state-of-the-art it is not really possible to predict gas permeation rates or gas selectivity even when rather minor changes are made in the chemical structure of the membrane of one polymer class, such as the polyesters or polycarbonates, even where certain structural features remain constant. The literature also indicates that variations in the membrane itself, be it isotropic, asymmetric or composite in structure, and its thickness can also have a marked effect on permeation rate and selectivity. The inference drawn from the literature is that the inclusion of a large number of arbitrary modifications to the basic polymer structure of one or more polymer classes in many membrane patents is not fully instructive in predicting the usefulness of the alternative structures that had not been studied. It would appear that careful consideration needs to be given to defining both the chemical and physical structures of membranes suitable for use in gas separation processes.

Many of the factors which influence gas permeability have been largely known for over two decades, but the ability to quantitatively predict the magnitude and even direction of a combination of these factors in a specific polymeric membrane has not been successful to this day. In the nineteen-fifties and nineteen-sixties researchers knew that the attractive forces between polymer chains, packing density, rotation around single bonds in the polymer chain, and the relative rigidity (aromatic structures) or flexibility (aliphatic structures) of the polymer chain affected gas permeability. Rigid highly aromatic polymer structures such as bisphenol-A polycarbonates were examined in the nineteen-sixties and early nineteen-seventies in attempts to obtain an optimum combination of gas permeability and gas separation or selectivity. For example, outstanding values of gas selectivity for oxygen/nitrogen were obtained, but this was not combined with sufficiently high gas permeability and the desire to attain higher gas permeability has continued.

A publication in August 1975 by Pilato et al. (Amer. Chem. Soc. Div. Polym. Chem., Polym. Prepr., 16(2) (1975) 41–46) showed that it is possible to modify rigid aromatic polymer structures such as polysulfones, polycarbonates and polyesters, including certain bisphenol-phthalate polyesters not within the scope of this invention, to increase the gas permeation rate without significant decreases in helium/methane and carbon dioxide/methane separations. More data by Pilato et al.

show that the incorporation of tetraisopropyl bisphenol A or tetramethylbisphenol L' (based on Limonene—Dimethylphenol) in these polymers to try to increase the gas flux resulted in decreased gas selectivity. Therefore, even in the rigid polymer systems, it appears that the general trend noted in the Polymer Handbook holds: increasing the gas permeability results in reduced gas selectivity. Based on this work and the other publications, infra, it appears that additional effort was necessary to achieve higher gas permeability and still retain high gas selectivity.

Also in August 1975 another unusually broad disclosure appeared. U.S. Pat. No. 3,899,309 (Reissue 30,351, July 29, 1980), which described highly aromatic polyimides, polyamides and polyesters. The patent alleged the combination of main chain non-linearity, high aromatic structure and prevention of free rotation around main chain single bonds led to increased gas permeability. The disclosure is so broad that one is not adequately or fully instructed to enable a skilled person to determine which particular structure or structures would give the more desirable gas permeability and selectivity without extensive study and experimentation.

In U.S. Pat. No. Reissue 30,351, filed May 18, 1976 by H. H. Hoehn et al. (reissued on July 29, 1980), which is the reissue of U.S. Pat. No. 3,899,309 (issued on Aug. 12, 1975) there are broadly disclosed separation membranes of aromatic polyimides, polyesters, and polyamides. The invention broadly described and claimed in these patents requires the polymer aromatic imide, aromatic ester, or aromatic amide repeating unit must meet certain requirements, namely:

(a) it contains at least one rigid divalent subunit, the two main chain single bonds extending from which are not colinear, (b) is sterically unable to rotate 360° around one or more of said main chain single bonds, and (c) more than 50% of the atoms in the main chain are members of aromatic rings.

These requirements are set forth in the reissue patent in the Abstract; at column 1, lines 40 to 53; in claim 1 and in all claims dependent upon claim 1. The manner in which requirement (a) is determined is set forth in column 2, lines 51 to 68; the determination of requirement (b) is described in column 3, lines 1 to 28; and the determination of requirement (c) is described in column 3, lines 29 to 56; with column 3, lines 57 to 68 explaining how the requirements were determined in the examples. Thus, for a polymer to be within the orbit of the invention described and claimed in Re. 30,351 it must meet all three criteria or requirements defined in the patent. Should it fail to meet all three requirements it cannot be considered a polymer falling within the orbit of the invention. Requirement (b) of Re. 30,351 restricts the membranes to those from polymers in which the polymer chain contains at least one rigid monolinear bond between rigid subunits around which subunit the polymer chain is sterically prevented from rotating 360° and specifically describes the manner in which this can be ascertained by the use of a clearly identified, readily available molecular model kit. Thus, a polymer structure assembled from the identified kit which is not sterically prevented from rotating 360° cannot be considered as being within the scope of Re. 30,351.

Re. 30,351 defines the polyesters alleged to meet the requirements (a), (b), and (c) at column 2, lines 21 to 34; column 6, lines 26 to 56; column 7, lines 19 to 29 and 42 to 53 and column 11 line 62 to column 12, line 68 (Tables III and IV), with specific examples of polyesters and their membranes being shown in Examples 1–5, 9–12 and 22. The use of polyester membranes in the process is claimed in claims 1 and 8 to 13; with claims 12 and 13 being duplicates. The membranes of the invention are said to be in film form or hollow fiber form, column 4, lines 10 to 15 and lines 43 to 46 and it is stated they can be uniform membranes (column 4, lines 47 to 49) or asymmetric membranes (column 4, lines 49 to 54).

In U.S. Pat. No. 3,822,202, issued to H. H. Hoehn on July 2, 1974, the same polyimide, polyester and polyamide polymers are disclosed as suitable for use as membranes but in this patent the membranes are subjected to a heat treatment in an environment of air or an inert gas under vacuum at a temperature range of 150° C. up to just below the softening point of the polymer. This results in the formation of a true asymmetric membrane. In all of U.S. Pat. No. 3,822,202 there is no mention of composite membranes and the only example in U.S. Pat. No. 3,822,202 employing a polyester membrane is Example 21, which uses an air dried flat film 2.15 mils thick. It is to be noted that there is no specific disclosure in U.S. Pat. No. 3,822,202 of any membrane produced from a polyester of a tetrabromobisphenol and an aromatic dicarboxylic acid or the use thereof in a fluids separation process.

Most recently U.S. Pat. No. 4,822,382 issued to J. K. Nelson on Apr. 18, 1989. This patent discloses separation membranes, in particular composite membranes, having a separation layer comprised of one or more poly(tetramethyl) bisphenol A phthalates for use in separating a gas mixture. The patent does not disclose other polyesters within this class and the data in the examples show low permeation rates of oxygen in air separations.

In European Patent Application 0 242 147, published Oct. 21, 1987, Aneda et al. there are disclosed gas separation membranes based on polycarbonate polymers derived from bisphenols and their use in gas separation processes. The membranes are alleged to have particular application in separating oxygen from nitrogen, but they are not polyesters.

European Patent Application 0 244 146, published Nov. 4, 1987, Anand et al., disclosed membranes based on polyestercarbonate polymers in which the polymer backbone is a tetrabromo diphenolic residue, and the use of the polymers in gas separation processes, but they are not polyesters.

Both of these European Patent Applications are based on polycarbonate polymers containing the carbonate group

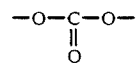

in the polymer chain. The presence of this carbonate link is an essential element of the inventions disclosed and is to be distinguished over the polyesters which contain the ester group:

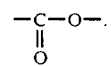

Japanese Unexamined Patent 53-66880, published June 14, 1978, Shoji Ueno et al., discloses membranes based on aromatic polyesters produced from aromatic dicarboxylic acids and bisphenols of the structure:

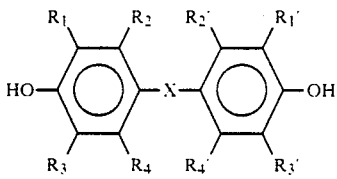

wherein $R_{4-1}$ and $R'_{1-4}$ are hydrogen, halogen or hydrocarbon; and

X is either —O—, —SO$_2$—, —CO—, —S—, alkylene, or alkylidene.

All of the bisphenols disclosed and discussed as suitable contain one of the defined X groups as the linking or bridging group. The Japanese publication contains no disclosure or suggestion of any bisphenol compound in which the linking group contains either halogen atoms or a divalent cycloalkyl group.

SUMMARY OF THE INVENTION

This invention comprises an improved gas separation membrane consisting predominantly of a polyester or copolyester based on (1) at least 50 mole percent or more, preferably 80 mole percent or more and most preferably 100 mole percent of a tetrabromobisphenol of the general formula:

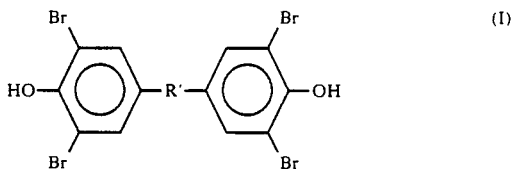

as hereinafter more fully defined, reacted with (a) 80 mole percent or more of isophthaloyl dichloride and/or 4-bromoisophthaloyl dichloride and (b) 20 mole percent or less of terephthaloyl dichloride and/or 2-bromoterephthaloyl dichloride, or (2) at least 50 mole percent or more, preferably 50 mole percent or more and most preferably 100 mole percent of said tetrabromobisphenol (I) reacted with (a) 30 mole percent or less of isophthaloyl dichloride and/or 4-bromoisophthaloyl dichloride and (b) 70 mole percent or more of terephthaloyl dichloride and/or 2-bromoterephthaloyl dichloride. Alternatively one can use the free acid or ester or salt forms of the phthaloyl compounds in producing the polyesters. This invention also comprises the use of said membrane in processes for the separation of oxygen from nitrogen and the separation of carbon dioxide from methane.

DETAILED DESCRIPTION OF THE INVENTION

This invention provides novel improved polyester permeable membranes having exceptional oxygen/nitrogen and carbon dioxide/methane gas separation properties with enhanced oxygen and carbon dioxide permeabilities.

The preparation of polyesters is well known and several procedures can be used. Thus, it is known that they can be produced by the reaction of a dihydroxyl compound with an aromatic dicarboxylic acid or an ester-forming derivative thereof such as an acid chloride. The method for producing the polyesters comprising the gas separation membranes of this invention is not a part of this invention and any polyesterification process can be used. A typical procedure employed for preparing the polyester membranes of this invention is the reaction of the tetrabromobisphenol compound (I) with terephthaloyl chloride, isophthaloyl chloride or mixtures thereof. Such a process is disclosed in U.S. Pat. No. 3,388,097, issued June 11, 1968 to Cramer et al. The phthaloyl compounds are used at a mole ratio of terephthaloyl to isophthaloyl compounds of 80:20 to 0:100, preferably 20:80 to 0:100, and most preferably 0:100 for polyesters based on 50 mole percent or more of tetrabromobisphenol (I) for oxygen/nitrogen separations (e.g. air separations). A mole ratio of terephthaloyl to isophthaloyl compounds of 100:0 to 0:100, preferably 90:10 to 70:30, and most preferably 85:15 to 75:25 for polyesters based on 50 mole percent or more of tetrabromobisphenol (I) for carbon dioxide/methane separations. In addition, as is known to those skilled in this art, a small amount of another suitable aromatic dicarboxylic acid, the acid chloride or the ester can be used in the polyesterification process; further, a small amount of the aromatic dicarboxylic acid component can be replaced with an aliphatic dicarboxylic acid; these small amounts added should be in quantities that do not have any significant deleterious effect on permeability and/or selectivity. Further, one can use mixtures of the tetrabromobisphenols of Formula I with small amounts of other bisphenols or other aromatic and/or aliphatic diols with up to about 10 mole percent of tetrabromobisphenol (I) being replaced by other bisphenols or such diols. The preferred polyesters are those produced by the condensation polymerization of the tetrabromobisphenols of Formula I with terephthalic acid, isophthalic acid, or mixtures thereof, or of the salts or esters thereof, such as the acid chlorides. The Encyclopedia of Polymer Science & Technology, Mark et al. Editors, John Wiley and Sons, Interscience Division, New York, N.Y., publishers, 1969, Volume 11, pages 1 to 168, contains a description of the many processes known for the preparation of polyesters. In view of the extensive knowledge of these polymers, there is no need for any detailed description of the specific reactants that have been described above nor of the reaction conditions required for the polyesterification reaction. This technical material is well known to those of ordinary skill in the polyester art.

The gas separation membranes of this invention comprise a thin layer consisting predominantly of a polyester or copolyester derived from a tetrabromobisphenol of the general formula:

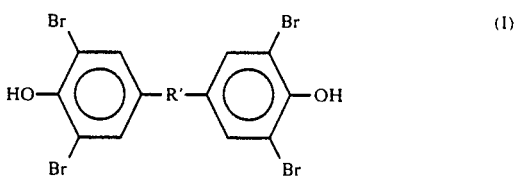

wherein R' is

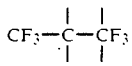

or divalent cyclododecyl.

The diol component of the polyesters or copolyesters constitutes more than 50 mole percent of tetrabromobisphenols (I), preferably at least about 80 mole percent of the tetrabromobisphenols (I) and can be 100 mole percent of said structure (I) in admixture with other bisphenols of the structure (II), below. The diols, thus, can be mixtures of more than 50 mole percent of the tetrabromobisphenols (I) and less than 50 mole percent of a bisphenol of the general formula:

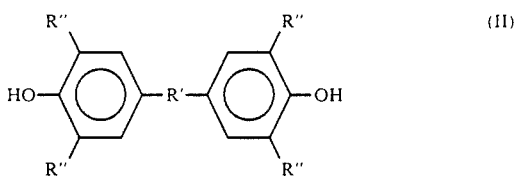

wherein R" is methyl or chlorine.

The tetrabromobisphenols (I) used in producing the polyester gas separation permeable membranes make up at least 50 mole percent or more of the dihydroxyl compound used to produce the polyesters, as stated above. The polyesters or copolyesters are the reaction products of:

(1) at least 50 mole percent or more of said tetrabromobisphenol (I) reacted with (a) 80 mole percent or more of isophthaloyl dichloride and/or 4-bromoisophthaloyl dichloride and (b) 20 mole percent or less of terephthaloyl dichloride and/or 2-bromoterephthaloyl dichloride as the dicarboxylic acid compound, or (2) at least 50 mole percent or more of said tetrabromobisphenol (I) reacted with (a) 25 mole percent or less of isophthaloyl dichloride and/or 4-bromoisophthaloyl dichloride and (b) 75 mole percent or more of terephthaloyl dichloride and/or 2-bromoterephthaloyl dichloride.

The polyester gas separation membranes of this invention contain as the predominant recurring unit the group having the structural formula:

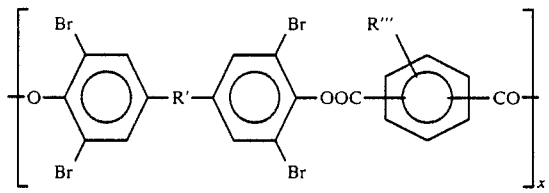

wherein R''' is hydrogen or bromine and x is an integer having a value of at least about 20 up to about 200 or more, preferably from about 25 to about 175. The polyester preferably has a weight average molecular weight of from about 20,000 to about 150,000, most preferably from about 30,000 to about 125,000.

The gas separation membrane of this invention can be of dense film or of any form known to those skilled in the art. Further, it can be a composite membrane, an asymmetric membrane, or a homogeneous membrane or isotropic membrane. The membranes may be in spiral form, flat sheet, tubular form, or other configurations, as well as in hollow fiber form. Those skilled in the art are aware of the many methods available for their production and know how to prepare the membranes in any of these forms. The preferred membranes of this invention are the asymmetric or composite membranes, with separation layers less than 10,000 Angstroms thick, preferably less than 5,000 Angstroms thick, most preferably from about 200 to about 2,000 Angstroms thick.

The isotropic and asymmetric type membranes are generally comprised essentially of a single permeable membrane material capable of selective oxygen/nitrogen and carbon dioxide/methane separations. Asymmetric membranes are distinguished by the existence of two or more morphological regions within the membrane structure; one such region comprising a thin relatively dense semipermeable skin capable of selectively permeating at least one component from the gas mixture containing said at least one component in admixture with other components, and the other region comprising a less dense, porous, essentially non-selective support region that serves to preclude the collapse of the thin skin region of the membrane during use. Composite membranes generally comprise a thin layer or coating of the polyester semipermeable membrane material superimposed on a porous substrate.

Flat sheet membranes are readily prepared from polyester solutions in a suitable solvent, e.g. methylene chloride, by casting the solution and evaporating the solvent, and thereafter drying and curing the cast film, either under vacuum, at elevated temperature, or a combination of both. Such thin film membranes can vary in thickness from about 0.5 mil to about 10 mils or more, preferably from about 1 mil to about 3 mils.

Flat sheet membranes are generally not the preferred commercial form. In large scale commercial applications hollow fiber permeable membranes are generally more desirable because they provide a significantly larger surface area per volume unit when fabricated as modules. The porous hollow fiber permeable membranes comprise a porous hollow fiber support having a permeable membrane layer on the surface thereof. The methods for their production are well known (See for example, "Hollow Fibers Manufacture and Applications", ed. J. Scott, Noyes Data Corporation, New Jersey, 1981, p. 264 et seq.)

The tetrabromobisphenol type polyester permeable separation membranes of this invention exhibit a high separation factor for oxygen over nitrogen from air mixtures of at least about 5.6 coupled with a permeability rate or flux of at least about 4 and a high separation factor for carbon dioxide over methane in mixtures containing said gases. The ability of these membranes to separate these components with such high combination of both separation factor and permeability rate was completely unexpected and is superior to the results often exhibited by many existing membranes in the art. Thus, for example, the polycarbonate membranes disclosed in EPO 0 242 147 and the polyestercarbonate membranes disclosed in EPO 0 244 126 have relatively low permeability rate. None of the membranes in these EPO applications show a combination of high selectivity and high permeation rate. The data in the Table of EPO 0 244 126 show low oxygen permeability P for the polyestercarbonate membranes of from 0.96 to 1.23 Barrers combined with a separation factor or selectivity for oxygen over nitrogen of 6.7 or 7.2; these values are not considered in the art as a high combination of the two values. Likewise in Table 1 of EPO 0 242 147 the data show low oxygen permeability P for the polycarbonate membranes of from 0.8 to 1.448 Barrers combined with a separation factor or selectivity for oxygen over nitrogen of 5.4 to 7.4; again not considered a high combination of the two values.

The tetrabromobisphenol polyester membranes of this invention, as shown by the experimental data in the Examples show a combination of both high selectivity and high permeation rate. As seen in the data obtained and reported in the examples, infra, oxygen permeability P of the membranes of this invention of from about 4.7 up to about 11.8 Barrers combined with a separation factor or selectivity for oxygen over nitrogen of from about 5.6 up to about 7, are truly a combination of the two high values.

It was found that high percentages of isophthalic acid versus terephthalic acid polyesters of tetrabromohexafluoro bisphenol A (I) significantly increases the oxygen/nitrogen selectivity over that of polyesters with high amounts of terephthalic acid without yielding low oxygen permeability of less than 4.5 Barrers. Preferably the isophthalic acid ester content should be 80 mole percent or higher and most preferably 100 mole percent isophthalic acid ester. In contrast, for carbon dioxide/methane separations, surprisingly the optimum combination of separation and permeability is achieved when the terephthalic acid ester content is about 75 mole percent or more and isophthalic acid ester content is 25 mole percent or less with the same tetrabromohexafluorobisphenol. The oxygen/nitrogen separation is significantly less efficient with high terephthalic acid ester content. Therefore, for oxygen/nitrogen separations a high isophthalic acid ester content is preferred, while for carbon dioxide/methane separations a high terephthalic acid ester content is preferred.

Copolyesters based on 50 mole % or greater and preferably 60 mole % or greater of compounds of formula (I), such as tetrabromohexafluoro bisphenol A and one or more other bisphenols (compound III in the table) can also provide useful gas separation membranes with less favorable intrinsic permeability and gas separation properties than the previously mentioned tetrabromobisphenol polyesters. However, many of these copolymers provide solubility characteristics slightly more favorable than the bromobisphenol polymers for preparing composite membranes by coating onto polysulfone hollow fiber as described in U.S. Pat. No. 4,822,382 with some sacrifice in selectivity and, usually, improvements in permeability. Solubilities of the polyesters in specific solvent and solvent systems are important because the polysulfone hollow fiber is susceptible to attack by many common solvents used to dissolve many membrane polymers. Therefore, even if a polyester has excellent intrinsic separation and permeability properties, if it cannot be coated on a substrate such as polysulfone or other porous hollow fiber substrates, its usefulness becomes limited. Chemically resistant porous hollow fibers as substrates for these coatings would be ideal if costs, coatability, and other factors are overcome to make them useful for composite membranes. Of course, asymmetric hollow fiber membranes can be made entirely from these polymers, but the costs will be much higher. Methods other than solution coating can be possible, but need to be developed in the future.

Polyesters based on tetrabromohexafluoro bisphenol A have been disclosed previously in the Hoehn U.S. Pat. No. 3,899,309 but it does not specifically anticipate or suggest the unexpected and unpredictable improvements provided for oxygen/nitrogen and carbon dioxide/methane separations achieved by the above claimed structures. Claim 11 of U.S. Pat. No. 3,899,309 discloses an isophthalate/terephtalate polyester based on tetrabromohexafluorobisphenol A. Column 8, lines 25-35, states that the preferred isophthalate/terephthalate composition ratio is 70/30. Moreover, in column 16, line 17-18 the tetrabromohexafluoro bisphenol A is not included in the list of preferred diols (bisphenols).

The data in the table below show that the specific polyesters and copolyesters provide an incomparable combination of extremely good oxygen/nitrogen separation factors and high oxygen gas permeability when compared with previously known examples in the literature.

| COMPARISON OF GAS MEMBRANES FOR OXYGEN/NITROGEN SEPARATIONS | | | |
|---|---|---|---|
| Bisphenol(s) 100/0 | Ratio Iso/Tere | Permeability (Barrers) $P(O_2)$ | Separation Factor $O_2/N_2$ |
| 1. $TBrF_6BA(I)$ | 100/0 | 5.25 | 6.7 |
| 2. $TBrF_6BA(I)$ | 80/20 | 5.70 | 6.4 |
| 3. $TBrF_6BA(I)$ | 25/75 | 9.0 | 6.1 |
| 4. $TClF_6BA(III)$ | 100/0 | 5.64 | 6.12 |
| 5. Dow* TBrBA Polycarbonate | | 1.87 | 6.9 |
| 6. Dow* Polycarbonate | | 0.85 | 7.4 |
| 7. Dow* Polycarbonate | | 1.87 | 6.9 |
| 8. Hoehn** Polyester | | 1.79 | 5.5 |
| 9. Hoehn** Polyester | | 1.30 | 5.6 |
| 10. Polysulfone*** | | 1.2 | 5.9 |
| 11. Cellulose acetate*** | | 1.0 | 5.5 |

*Dow U.S. Pat. No. 4,818,254
**Hoehn U.S. Pat. No. 3,899,309. Re. No. 30,351
***Commercial gas separation membranes
(I) Compound I of Experiment 1, infra
(III) Tetrachlorohexafluorobisphenol-A Note in the table that the tetrabromohexafluoro bisphenol A polyisophthalate of Run 1 has a high oxygen/nitrogen separation factor of 6.7 and high oxygen permeability of 5.25 Barrers compared to only 1.87 with a comparable separation factor of 6.9 of Run 7. Other factors being equal the latter membrane will require almost three times the membrane area to the former example, a decided economic advantage. Other examples in the Hoehn reissue patent have considerably lower gas selectivity which are not competitive with Run 1 in the table.

Carbon dioxide/methane separations have been difficult because factors which lead to high carbon dioxide permeability yield low carbon dioxide/methane separation factors. The table below shows that the commercially available membranes based on cellulose acetate and polysulfone yield good separations for this gas pair but the permeability for carbon dioxide is low and needs to be higher for more commercially economical operations. The tetramethyl bisphenol A polycarbonate appears to have the best combination of permeability and separation factor reported in the literature but it is not as good as the polyester of tetrabromohexafluoro bisphenols (I) of this invention.

Structures of this invention exhibit a remarkable combination of very high permeability and carbon dioxide/methane separations based on pure/mixed gas measurements. In the optimum structure for oxygen/nitrogen separations the tetrabromohexafluoro bisphenol A high isophthalic acid ester yields the best separation and permeability combinations. Surprisingly an unusually high carbon dioxide permeability is seen in the 25/75 isophthalic/terephthalic acid ester ratios with essentially no significant decrease in gas selectivity for carbon dioxide/methane. This remarkable doubling of the carbon dioxide permeability from the 100% isophthalic acid ester structure where P=20.0 to P=42 in the 25/75 isophthalic/terephthalic acid ester structure without a significant decrease in gas selectivity was not expected.

Comparison of Gas Membranes
for Carbon Dioxide/Methane Separation

| Bisphenol | Ratio Iso/Tere | Permeability P(CO$_2$) | Separation Factor CO$_2$/CH$_4$ |
|---|---|---|---|
| 1. TBrF$_6$BA(1) | 100/0 | 20.0 | 50.0 |
| 2. TBrF$_6$BA(1) | 25/75 | 42.0 | 44.0 |
| 3. Dow TMBA PC* | — | 16.3 | 26.7 |
| 4. Polysulfone | | 5.5 | 26.0 |
| 5. Cellulose Acetate | | 6 | 30.0 |

*Dow U.S. Pat. No. 4,818,254
(1) Compound I of Experiment 1, infra

Note that the tetrabromohexafluoro bisphenol A 25/75 isophthalic/terephthalic acid ester membrane of this invention has substantially improved properties over the other known polymeric membranes and the same polyester based on 100% isophthalic acid.

Although the data are limited on the various combinations of isophthalic/terephthalic acid ester ratios in the copolymers they do show that we can vary the permeability and gas selectivity by varying the bisphenol and by analogy with the above examples the isophthalic/terephthalic acid ester ratios as shown in the experimental section.

The reduced viscosities of the polyesters were determined at 25° C. using a polymer solution containing 0.200 g of polymer per 100 ml of chloroform and calculated by the equation $$RV = \frac{A - B}{(C)(B)}$$

wherein A is the time it takes the sample of chloroform solution to travel through the viscometer, B is the time it takes chloroform to travel through the viscometer and C is the weight of the sample of chloroform solution.

The polyesters were film forming at a reduced viscosity in chloroform of about 0.25 and above. For gas permeable processes the polyester having viscosities of about 0.25 or higher provide adequately strong films of about 2 mils to about 5 mils thick; preferred viscosities are from about 0.25 to about 1.6, most preferably from about 0.45 to about 1.3. The film thickness can vary from about 1 mil to about 10 mils, preferably from about 2 mils to about 5 mils.

Porous hollow fiber polysulfone substrates are useful in the preparation of composite membranes. Porous polysulfone hollow fibers are produced from solutions of the polysulfone in a solvent/nonsolvent mixture, as is known in the art, using the procedure described by I. Cabasso et al. in "Composite Hollow Fiber Membrane", Journal of Applied Polymer Science, 23, 1509–1523 and in "Research and Development of NS-1 and Related Polysulfone Hollow Fibers For Reverse Osmosis Desalination of Seawater" PB 248,666, prepared for the Office of Water Research and Technology, Contract No. 14-30-3165, U.S. Department of the Interior, July 1975. The well known tube-in-tube jet technique is used for the spinning procedure, with water at about room temperature being the outside quench medium for the fibers. The quench medium in the center bore of the fiber was air. Quenching is generally followed by extensive washing to remove pore forming material. Following the wash, the hollow fibers are dried at elevated temperature by passage through a hot air drying oven.

Advantageously, the walls of the porous polysulfone hollow fibers are sufficiently thick so that no special apparatus would be required for their handling and they can be conveniently formed into cartridges. The outside diameter of the porous polysulfone hollow fiber can vary from about 1 mil or less to about 100 mils or more, preferably from about 2 mils to about 80 mils. The wall thickness of the porous polysulfone hollow fiber can vary from about 0.1 mil to about 25 mils or more, preferably at least about 0.2 mil up to about 20 mils. The spun polysulfone fibers are generally considered to be substantially isotropic, however, some degree of asymmetry is usually present. Porosity of hollow fibers can be modified, by annealing techniques, particularly by heat annealing. This is conventionally performed by passing the dried porous polysulfone hollow fiber through a hot air oven at a temperature of from about 160° C. up to close to the glass transition temperature of the polysulfone (195°–200° C.) for a period of less than about 30 seconds, preferably not more than about 10 seconds.

The gas permeability or permeation rate P measurements of the flat film membranes evaluated in the following examples were determined at 25° C. by placing a small disc of the polymer membrane film of known thickness in a constant volume—variable pressure permeation cell. Both sides of the membrane were degassed under vacuum overnight and one side of the membrane was then exposed to the gas at 25 psig. The permeate gas was collected in a reservoir on the other side of the membrane and the gas pressure was measured using a sensitive transducer. The pressure build-up as a function of time was recorded on a strip chart and the data was used to determine the steady state permeation rate P. The permeability rate P is reported in Barrer units, a Barrer unit being:

(cm$^3$ (STP) cm/cm$^2$-sec. cm Hg)×10$^{10}$

The membranes were prepared from 2 to 10 weight percent polymer solutions in methylene chloride and were from about 2 to about 10 mils thick. The solvent was removed under vacuum at 40° C. and finally at 125° C. for 5 days before evaluation.

Experiments 1 to 5 show the preparation of intermediates used for producing polyester membranes used in the examples of this invention. The structures of the compounds were confirmed by both proton and C-13 nuclear magnetic resonance analyses, and melting points.

EXPERIMENT 1

The procedure used was that described by F. S. Holahan et al., Makromol. Chem., 103(1), 36–46 (1967).

To a two liter 3-necked flask equipped with a stirrer, addition funnel, condenser, thermometer and a 10% sodium hydroxide trap there were added 201.76 grams of 4,4'-[2,2,2-trifluoro-1-(trifluoromethyl)ethylidene] bisphenol, 300 ml ethanol, and 140 ml water. To this reaction mixture was added with good stirring 124.84 ml of bromine over a 3 hour period at 15° C. The reaction mixture was stirred overnight. About 3 grams of sodium thiosulfate was added to decompose the excess bromine. Three liters of distilled water was added to precipitate the product. The product was filtered and washed 3 times with water and dried in a vacuum oven at 80° C. Yield of 4,4'[2,2,2-trifluoro-1-(trifluoromethyl)ethylidene]bis[2,6-dibromophenol] (Compound I) was 388 grams. The product was recrystallized from chlorobenzene to give an overall yield of 87% m.p.=256.5°-258° C. Literature m.p.=256°-257° C.

EXPERIMENT 2

A one liter 3-necked round bottom flask was equipped with a stirrer, chlorine gas inlet fitted sparge tube, a dry ice-acetone condenser, and an outlet leading to a 10% sodium hydroxide trap and charged with 67.25 g of 4,4'-(hexafluoroisopropylidene) diphenol and 600 ml of dichloromethane, and cooled with an ice water bath to about 20° C. Chlorine gas was sparged in at a rate to maintain a saturated solution; the temperature was controlled at about 20° C. After 8 hours the dichloromethane was removed using a rotary evaporator under vacuum to obtain 88 g (93% yield) of 4,4'-[2,2,2,-trifluoro-1-(trifluoromethyl)ethylidene]bis[2,6-dichlorophenol](Compound II). Recrystallization in methanol/water gave an overall yield of 80% of purified product, m.p. 225°-227° C. (Literature mp 223°-224° C.-see experiment 1).

EXPERIMENT 3

To a 1000 ml 3-necked round bottom flask equipped with an addition funnel, thermometer, thermowatch temperature regulator and a dry ice/acetone condenser insulated with glass wool was added 457.5 grams 2,6-dimethylphenol, 75 grams methane sulfonic acid, and the reaction mixture was heated to 95° C. Then 75 grams of 1,1,1,3,3,3-hexafluoro-2-propanone sesquihydrate was added dropwise in one hour. The reaction mixture was heated to 148° C. in two hours. In 3 additional hours the temperature was up to 160° C. The progress of the reaction was followed by isolating a 10 gram sample and removing the acid with water and sodium bicarbonate and the dimethyl phenol with methylene chloride, drying, and taking a melting point. After 15 hours at 160° the melting point was 208°-217° C. In 22 hours at 160° the melting point was 221°-223° C. The reaction mixture was worked up by pouring the warm semi-solid into a 4000 ml beaker and washing it 5 times with 2000 ml portions water. Then 400 ml of methylene chloride was added and the sample washed an additional 3 times with 20 ml portions of water. Complete acid neutralization was obtained by adding a few grams of sodium bicarbonate. The methylene chloride layer was separated along with some solid and the solvent and residual dimethylphenol was removed on the rotary evaporator via vacuum up to 165° C. Yield of 4,4'-[2,2,2,-trifluoro-1-(trifluoromethyl)ethylidene]bis[2,6-dimethylphenol] (Compound III) was 117 grams. The sample was washed with 500 ml of methylene chloride and 500 ml toluene, and finally with 150 ml of methylene chloride, dried in a vacuum oven at 80° C. Yield 64 grams. The mp=219°-21.5° C. Literature U.S. Pat. No. 4,358,624 (11/9/82) mp=218°-219° C.

EXPERIMENT 4

To a 3000 ml 3 necked round bottom flask equipped with a mechanical stirrer, a gas sparger, thermometer, thermowatch temperature regulator, hydrogen chloride lecture bottle connection, and a 10% sodium hydroxide trap for the hydrogen chloride which escapes from the reactor, and an ice bath to keep the temperature at 20° C. there were added 273.45 grams cyclododecanone, 837.0 grams 2,6-dimethylphenol, 27.0 ml n-octyl mercaptan, 315.0 ml methylene chloride. Hydrogen chloride was sparged through the solution for 7½ hours at such a rate to obtain a saturated solution. The solids obtained after 2 days at room temperature was filtered and washed 4 times with 2000 ml portions of methylene chloride. Recrystallization twice from toluene gave a 19.7% overall yield of the bisphenol, 1,1-bis(3,5-dimethyl-4-hydroxyphenol)cyclododecane (Compound IV). mp=240.5°-242.5° C. Literature U.S. Pat. No. 4,554,309 mp=239°-240.5° C.

EXPERIMENT 5

Procedure for the preparation of the 4-Bromoisophthaloyl and 2-bromoisophthaloyl chlorides from their corresponding acids.

To a 500 ml 3-necked roundbottom flask equipped with a mechanical stirrer, dropping funnel, condenser, a silicone oil heating bath, a nitrogen inlet and an outlet leading to a sodium hydroxide scrub solution were added 100 grams (0.408 mole) of monobromoiso-or monobromo-terephthalic diacid and 1 ml pyridine. Then 202 ml (328.5 grams, 2.77 moles) of thionyl chloride were added dropwise. When all material was added, the mixture was refluxed for 24 hours while hydrochloric acid and sulfur dioxide were given off. During this time a yellow solution was obtained. On standing overnight no crystals developed indicating that the diacid chlorides were liquids. The excess $SOCl_2$ was distilled off and the yellowish oily crude product was boiled with a seven-fold excess of n-hexane. The hot solution was filtered to remove unreacted diacids. The hexane was distilled off. The samples were further purified by distilling at a reduced pressure of 3-4 mm Hg at 125°-132° C.

In separate experiments, about 70 grams each of a yellowish 4-bromoisophthaloyl chloride and a purplish colored 2-bromoterephthaloyl chloride of oily appearance were obtained and used directly in the polymerizations.

The following examples serve to further illustrate the invention. In the examples the aromatic dicarboxylic acid derivatives used were terephthaloyl chloride and isophthaloyl chloride or mixtures thereof, unless otherwise stated. Parts are by weight unless otherwise indicated.

The flat membranes were prepared from 3 to 7 weight percent polymer solutions in methylene chloride. A portion of the solution was poured onto a glass plate and kept covered overnight with an aluminum lid at ambient conditions. The film was stripped off the plate and dried in a vacuum oven at 40° C. for one day. Then the film was further dried at 125° C. in vacuum for 5 days and its thickness measured. The membrane was tested at 25° C. and 2 atmospheres pressure for pure gas, oxygen and nitrogen permeabilities.

The polyesters were prepared by known interfacial polymerization procedures in a Waring Blender and in a three-necked round bottom flask with mechanical stirring and cooling with an ice bath. The stir rate was not always monitored, but it was generally about 1000 rpm. The rate of addition of the acid chloride was based on the control of the exotherm. As is well known in the literature ("Condensation Polymers by Interfacial and Solution Methods", Chapter VII, Paul W. Morgan, Interscience Publishers, 1965.), if everything else is constant, the molecular weight is higher the faster the acid chlorides are added to the reaction mixture. Also faster stir rates are significantly helpful and the use of a Morton flask appeared to help obtain higher molecular weights.

EXAMPLE 1

A. Preparation of Polyarylate from 4,4'-[2,2,2,-trifluoro-1-(trifluoromethyl)ethylidene]bis[2,6-dibromophenol] (Compound I) and 100% Isophthaloyl chloride.

To a 3-necked 500 ml round bottom Morton flask equipped with a mechanical stirrer, thermometer, addition funnel, nitrogen inlet and condenser there were added 26.07 grams of Compound I, 0.4 grams tetrabutyl ammonium hydrogen sulfate, 10.25 grams of 45.9% aqueous potassium hydroxide and 40 ml of distilled water, and 40 ml of methylene chloride. With ice water cooling, a solution of 8.12 grams of isophthaloyl chloride in 80 ml of methylene chloride was added in about 15 minutes with very fast stirring. After stirring for about 2 hours, 100 ml of methylene chloride was added and the mixture acidified by adding 0.5% sulfuric acid. The polymer solution was washed three times with 1000 ml of distilled water. The polymer was coagulated in methanol and dried in a vacuum oven at 80° C. overnight. The yield was 27.2 grams of polyester. The reduced viscosity was 0.42.

B. A gas permeable flat membrane having a thickness of 2.06 mils was prepared and evaluated for the permeation of oxygen, nitrogen, carbon dioxide, methane and helium.

The oxygen P=5.25 ($\times 10^{-10}$ cm$^3$(STP)-cm/cm$^2$-sec-cmHg (Barrers). The oxygen/nitrogen selectivity was 6.7.

The carbon dioxide P=19.9 Barrers and the carbon dioxide/methane selectivity at 35 psia using pure gases was 50.

The helium P=57 Barrers and the helium/methane selectivity was 133.

The nitrogen P=0.787 Barrers and the nitrogen/methane selectivity was 1.8.

EXAMPLE 2

A. Preparation of Polyarylate from Compound I and 80/20 Isophthaloyl/terephthaloyl chlorides.

Essentially the same procedure as in Example 1 but for two changes in quantities of reagents. 10.734 grams of 45.9% aqueous potassium hydroxide and 6.5 grams of isophthaloyl chloride and 1.625 grams of terephthaloyl chloride were charged. The yield of polyester was 28 grams; the reduced viscosity was 0.37. This polymer has an iso/tere ratio of 80/20.

B. A gas permeable flat membrane having a thickness of 1.24 mils was prepared and evaluated for the permeation of oxygen, nitrogen, carbon dioxide, methane and helium.

The oxygen P=5.7 (Barrers). The oxygen/nitrogen selectivity was 6.4.

The carbon dioxide P=24 Barrers and the carbon dioxide/methane selectivity using pure gases was 48.

The helium P=58 Barrers and the helium/methane selectivity was 113.

EXAMPLE 3

A. Preparation of Polyarylate from 4,4'-[2,2,2,-trifluoro-1-(trifluoromethyl)ethylidene]-bis[2,6-dibromophenol] (Compound I) and 25/75 Isophthaloyl/terephthaloyl chlorides.

To a 3-necked 500 ml round bottom Morton flask equipped with a mechanical stirrer, thermometer, addition funnel, nitrogen inlet and condenser there were added 52.15 grams of Compound I, 0.8 grams of tetrabutyl ammonium hydrogen sulfate, 19.94 grams of 45.9% aqueous potassium hydroxide and 160 ml of distilled water, and 80 ml of methylene chloride. With ice water cooling, a solution of 12.18 grams terephthaloyl chloride and 4.06 grams of isophthaloyl chloride in 160 ml methylene chloride was added in about 15 minutes with very fast stirring. After stirring 80 minutes 100 ml of methylene chloride was added and the mixture acidified by adding 0.5% sulfuric acid. The polymer solution was washed three times with 500 ml of distilled water. The polymer was coagulated in methanol and dried in a vacuum oven at 80° C. overnight. The yield was 54.5 grams of the polyester. The reduced viscosity was 0.89.

B. Following the procedure described in Example 1 a gas permeable flat membrane 2.7 mils thick was evaluated. A combination of high values from both the permeability rate and the selectivity was found to exist in both gas separation processes.

The oxygen P=9.0 Barrers. The oxygen/nitrogen selectivity was 6.1.

The carbon dioxide P=42 Barrers and the carbon dioxide/methane selectivity was 42 based on pure gases at 35 psia.

The helium P=75 Barrers and the helium/methane selectivity was 75.

The nitrogen P=1.5 Barrers and the nitrogen/methane selectivity was 1.5.

The tetrabromobisphenol A polycarbonate resin of Example 1 of EPA 0 242 147 showed the oxygen P=0.8 Barrer and an oxygen/nitrogen selectivity of 7.4 in Table 1 of that application. The tetrabromobisphenol A polyestercarbonate resin of Example 4 of EPA 0 244 126 showed the oxygen P= 1.23 Barrers and an oxygen/nitrogen selectivity of 7.2 in the Table.

The data for the bisphenol polyester of this invention shows a far superior combination of permeation and separation factor for oxygen/nitrogen compared to the values reported in the two references. The polyester membrane of this invention showed a permeation 11.25 times higher than that of the polycarbonate and 7.32 times higher than that of the polyestercarbonate of the references.

EXAMPLE 4

A. Preparation of Polyarylate from Compound I and 100% 4-Bromoisophthaloyl chloride.

Synthesis procedure was essentially the same as in Example 1 but for two changes. 4-Bromoisophthaloyl chloride (22.554 grams) was used and all quantities are one-half of Example 1. The reduced viscosity was 0.29 in chloroform.

B. A gas permeable flat membrane having a thickness of 3.91 mils was prepared and evaluated for the permeation of oxygen, nitrogen, carbon dioxide, methane and helium.

The oxygen P=4.7 Barrers and the oxygen/nitrogen selectivity was 6.8.

The carbon dioxide P=19.4 Barrers and the carbon dioxide/methane selectivity was 49 at 35 psia using pure gases. Mixed gas gave the carbon dioxide P=17.2 Barrers and a selectivity of 48 at 167 psia using a 50/50 mixture of gasses.

The helium P=51 Barrers and the helium/methane selectivity was 130.

The nitrogen P=0.68 Barrers and the nitrogen/methane selectivity was 1.7.

EXAMPLE 5

A. Preparation of Polyarylate from Compound I and 100% 2-Bromoterephthaloyl chloride.

Synthesis procedure is essentially the same as in Example 1. Two changes were made, 2-brominated terephthalic acid chloride was used in place of the isophthaloyl chloride of Example 1. Only half the molar quantities of Example 1 were used. The yield was 31.7 grams and the RV was 0.51.

B. Since the films looked very cloudy, possibly due to high level of crystallinity, no permeation measurements were made.

EXAMPLE 6

A. Preparation of Polyarylate from Compound I and 100% Terephthaloyl chloride.

Used essentially the same procedure described in Example 1. The only difference was 8.12 grams of terephthaloyl acid chloride was used instead of isophthaloyl acid chloride in Example 1. The yield was 29 grams of a polymer insoluble in methylene chloride; it appeared to be of crystalline structure.

EXAMPLE 7

A. Preparation of Polyarylate from an 80/20 Mole Ratio Mixture of Bisphenol Compounds I and III and a 75/25 Mole Ratio Mixture of terephthaloyl chloride and isophthaloyl chloride.

The procedure followed was that described in Example 3. The yield of polyester was 27.8 grams; the reduced viscosity was 0.39.

B. Following the procedure described in Example 1 a gas permeable flat membrane 2.3 mils thick was evaluated. A combination of high values for both the permeability rate and the selectivity was found to exist in the gas separation processes.

The oxygen P=9.3 Barrers. The oxygen/nitrogen selectivity was 5.8.

The helium P=73 Barrers and the helium/nitrogen selectivity was 46.

EXAMPLE 8

A. Preparation of Polyarylate from a 30 Mole Ratio Mixture of Bisphenol Compounds I and III and a 75/25 Mole Ratio Mixture of terephthaloyl chloride and isophthaloyl chloride.

The procedure followed was that described in Example 3. The yield of polyester was 24.93 grams; the reduced viscosity was 0.34.

B. Following the procedure described in Example 1 a gas permeable flat membrane 4.1 mils thick was evaluated. A combination of high values for both the permeability rate and the selectivity was found to exist in the gas separation processes.

The oxygen P=11.5 Barrers. The oxygen/nitrogen selectivity was 5.6.

The helium P=88 Barrers and the helium/nitrogen selectivity was 43.

EXAMPLE 9

A. Preparation of Polyarylate from a 60/40 Mole Ratio Mixture of Bisphenol Compounds I and IV and a 75/25 Mole Ratio Mixture of terephthaloyl chloride and isophthaloyl chloride.

The procedure followed was that described in Example 3 using 10.73 grams of 46 weight % potassium hydroxide and 40 more ml of water. The yield of polyester was 25.74 grams; the reduced viscosity was 0.57.

B. Following the procedure described in Example 1 a gas permeable flat membrane 4.2 mils thick was evaluated. A combination of high values for both the permeability rate and the selectivity was found to exist in the gas separation processes.

The oxygen P=8.83 Barrers and the oxygen/nitrogen selectivity was 5.66.

The helium P=68.5 Barrers and the helium/nitrogen selectivity was 44.

EXAMPLE 10

A. Preparation of Polyarylate from a 70/30 Mole Ratio Mixture of Bisphenol Compounds I and II and a 75/25 Mole Ratio Mixture of terephthaloyl chloride and isophthaloyl chloride.

The procedure followed was that described in Example 9. The yield of polyester was 27.1 grams; the reduced viscosity was 0.59.

B. Following the procedure described in Example 1 a gas permeable flat membrane 4.1 mils thick was evaluated. A combination of high values for both the permeability rate and the selectivity was found to exist in the gas separation processes.

The oxygen P=9.95 Barrers and the oxygen/nitrogen selectivity was 5.82.

The helium P=78 Barrers and the helium nitrogen selectivity was 46.

C. The pure gas carbon dioxide P=42 Barrers and the carbon dioxide/methane selectivity was 46. Mixed gas separation of a 50/50 $CO_2/CH_4$ mixture at 3 atmospheres pressure had a selectivity of 44 indicating no significant plasticization from carbon dioxide. This composition has a combination of both higher carbon dioxide permeability and better $CO_2/CH_4$ selectivity than reported in the art. If plasticization of these polyarylates does not occur, as indicated, these membranes are an unexpected and unpredictable advance in the $CO_2/CH_4$ separations field.

EXAMPLE 11

Preparation of Polyarylate from a 60/40 Mole Ratio Mixture of Bisphenol Compounds I and II and a 75/25 Mole Ratio Mixture of terephthaloyl chloride and isophthaloyl chloride.

The procedure followed was that described in Example 9. The yield of polyester was 18.4 grams; the reduced viscosity was 0.61. Following the procedure described in Example 1, permeable flat membranes can be prepared.

EXAMPLE 12

A. Preparation of Polyarylate from a 75/25 Mole Ratio Mixture of Bisphenol Compounds I and III and a 75/25 Mole Ratio Mixture of terephthaloyl chloride and isophthaloyl chloride.

The procedure followed was that described le 9. The yield of polyester was 26.3 grams; the reduced viscosity was 0.38.

B. Following the procedure described in Example 1 a gas permeable flat membrane about 4 mils thick was evaluated. A combination of high values for both the permeability rate and the selectivity was found to exist in the gas separation processes.

The oxygen P=11.8 Barrers and the oxygen/nitrogen selectivity was 5.53.

The helium P=85.1 Barrers and the helium/nitrogen selectivity was 40.

B. A gas permeable flat membrane having a thickness of 1.88 mils was prepared and evaluated for separation of oxygen and nitrogen.

The oxygen P=5.64 Barrers and the oxygen/nitrogen selectivity was 6.1.

The permeability values (P in Barrers) and the oxygen/nitrogen selectivity and the helium/nitrogen selectivity values for the polyesters of this invention (first nine entries) and of comparative data from the literature (last eight entries) as derived by the instant inventors are summarized in TABLE 1.

TABLE 1

| Ex. | $O_2/N_2$ | $CO_2/CH_4$ | $He/N_2$ | $He/CH_4$ | $N_2/CH_4$ | $O_2$ | $CO_2$ | He | $N_2$ |
|---|---|---|---|---|---|---|---|---|---|
| 1 | 6.7 | 50 | 72 | 133 | 1.8 | 5.25 | 19.9 | 57 | 0.787 |
| 2 | 6.4 | 48 | 66 | | | 5.7 | 24 | 58 | 0.88 |
| 3 | 6.1 | 42 | 50 | 75 | 1.5 | 9 | 42 | 75 | 1.5 |
| 4 | 6.8 | 49 | 75 | 130 | 1.7 | 4.7 | 19.4 | 51 | 0.68 |
| 7 | 5.8 | | 46 | | | 9.3 | | 73 | 1.6 |
| 8 | 5.6 | | 43 | | | 11.5 | | 88 | 2.1 |
| 9 | 5.66 | 35 | 44 | | | 8.83 | 40 | 68.5 | 1.56 |
| 10 | 5.82 | 46 | 46 | | | 9.95 | 42 | 78 | 1.71 |
| 12 | 5.53 | | 40 | | | 11.8 | | 85.1 | 2.1 |
| Comp. Run 1 | 6.1 | | | | | 5.64 | | | |
| Ex 1 (EPA-7) | 7.4 | | | | | 0.8 | | | |
| Ex 6 (EPA-7) | 5.0 | | | | | 3.9 | | | |
| Bis-A Polyether | 5.75 | | | | | 4.9 | | | |
| Ex 4 (EPA-6) | 7.2 | | | | | 1.23 | | | |
| Ex 2 (EPA-7) | 6.3 | | | | | 1.448 | | | |
| Ex 6 (EPA-7) | 5.0 | 26.7 | | | | 3.9 | 16.3 | | |
| Ex 7 (Texas) | 5.4 | | | | | 9.7 | | | |

Footnotes:
EPA-7 = EPO Application 0 242 147
EPA-6 = EPO Application 0 244 126
Texas = Tetrabromohexafluorobisphenol A polycarbonate. University of Texas. W. J. Koros and M. W. Hellums. September 26-27, 1989.

EXAMPLE 13

Preparation of Polyarylate from a 60/40 Mole Ratio Mixture of Bisphenol Compounds I and II and a 75/25 Mole Ratio Mixture of terephthaloyl chloride and isophthaloyl chloride.

The procedure followed was that described in Example 9 using 4.06 grams each of isophthaloyl chloride and terephthaloyl chloride. The yield of polyester was 25.2 grams; the reduced viscosity was 0.29. Following the procedure described in Example 1 a gas permeable flat membrane can be prepared.

EXAMPLE 14

Preparation of Polyarylate from a 60/40 Mole Ratio Mixture of Bisphenol Compounds I and IV and a 75/25 Mole Ratio Mixture of terephthaloyl chloride and isophthaloyl chloride.

The procedure followed was that described in Example 1 using 6.091 grams of isophthaloyl chloride and 2.03 grams of terephthaloyl chloride. The yield of polyester was 25.3 grams; the reduced viscosity was 0.75. Following the procedure described in Example 1 a gas permeable flat membrane can be prepared.

COMPARATIVE RUN 1

A. Preparation of Polyarylate from Compound II and 100% Isophthaloyl Chloride.

Following essentially the procedure in Example 2, a polyester was produced from 18.96 gms of compound II and 8.12 gms of isophthaloyl chloride with a yield of 19.9 gms. The reduced viscosity was 0.46 in chloroform.

What is claimed is:

1. A gas separation membrane comprising a thin layer consisting predominantly of a polyester or copolyester derived essentially from the reaction of an aromatic dicarboxylic acid or derivative thereof and greater than 50 mole percent of a tetrabromobisphenol of the general formula:

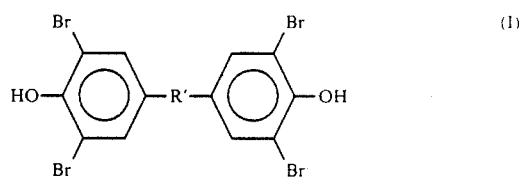 (I)

wherein R' is

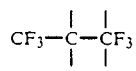

or divalent cyclododecyl and wherein said aromatic dicarboxylic acid or derivative thereof comprises (1) (a) 80 mole percent or more of isophthalic acid or its dichloride and/or 4-bromoisophthalic acid or its dichloride and (b) 20 mole percent or less of terephthalic acid or its dichloride and/or 2-bromoterephthalic acid or its dichloride as the dicarboxylic acid compound. or (2) (a) 30 mole percent or less of isophthaloyl dichloride and/or 4-bromoisophthalic acid or its dichloride and (b) 70 mole percent or more of terephthalic acid or its dichloride and/or 2-bromoterephthalic acid or is dichloride;

said membrane having a combination of high selectivity and high permeation rate values for $O_2/N_2$ and $CO_2/CH_4$ separations.

2. A gas separation membranes as claimed in claim 1 derived essentially from the reaction of an aromatic acid or derivative thereof and a mixture of diols comprising greater than 50 mole percent of said tetrabromobisphenol (I) and less than 50 mole percent of a bisphenol of the general formula:

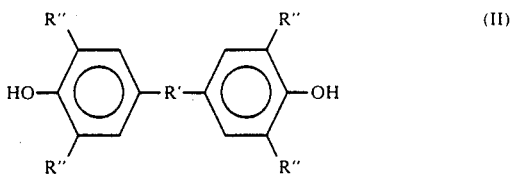

wherein R" is methyl or chlorine.

3. A gas separation membrane as claimed in claim 2 wherein said tetrabromobisphenol (I) comprises at least about 80 mole percent of the mixture of diols.

4. A gas separation membrane as claimed in claim 2 wherein said polyester based on aromatic dicarboxylic acid esters comprises a mixture of said bisphenols of said general formulas (I) and (II) wherein (I) is 4,4'-[2,2,2-trifluoro-1-(trifluoromethyl)ethylidene]bis[2,6-dibromophenol] and it is present at a concentration of 50 mole percent or greater in the copolyester.

5. A gas separation membrane as claimed in claim 4 wherein the bisphenols are a mixture of 4,4'-[2,2,2-trifluoro-1-(trifluoromethyl)ethylidene]bis [2,6-dibromophenol] and 4,4'-[2,2,2.-trifluoro-1-(trifluoromethyl)ethylidene]bis[2,6-dimethylphenol].

6. A gas separation membrane as claimed in claim 4 wherein the bisphenols are a mixture of 4,4'-[2,2,2-trifluoro-1-(trifluoromethyl)ethylidene]bis[2,6-dibromophenol] and 4,4'-[2,2,2-trifluoro-1-(trifluoromethyl)ethylidene]bis[2,6-dichlorophenol].

7. A gas separation membrane as claimed in claim 1 wherein said tetrabromobisphenol (I) comprises 100 mole percent of the bisphenol diols.

8. A gas separation membrane as claimed in claim 1 wherein said combination for oxygen and nitrogen shows a selectivity of at least about 5.6 to about 7.2 and a permeation of at least about 4.7 to about 11.8 Barrers at ambient temperature and/or said combination for carbon dioxide and methane shows a selectivity of at least 30 and a permeation of at least about 15 Barrers at ambient temperature.

9. A gas separation membrane as claimed in claim 8 wherein the bisphenols are a mixture of 4,4'-[2,2,2-trifluoro-1-(trifluoromethyl)ethylidene]bis[2,6-dibromophenol] and 1,1-bis(3,5-dimethyl-4-hydroxyphenyl)cyclododecane.

10. A gas separation membrane as claimed in claim 1 wherein said polyester comprises 100 mole percent isophthalate for membranes based on 4,4'-[2,2,2-trifluoromethy)ethylidene]bis[2,6-dibromophenol] for oxygen/nitrogen separations.

11. A gas separation membrane as claimed in claim 1 wherein said polyester comprises at least 70 mole percent terephthalate and not more than 30 mole percent isophthalate for membranes based on 4,4'-[2,2,2-trifluoro-1-(trifluoromethyl)ethylidene]bis[2,6-dibromophenol] for carbon dioxide/methane separations.

12. A gas separation membrane as claimed in claim 1, wherein said polyester comprises at least 70 mole percent 2-bromoterephthalate and not more than 30 mole percent 4-bromoterephthalate for membranes based on 4,4'[2,2,2-trifluoro-1-(trifluoromethyl)ethylidene]bis[2,6-dibromophenol] for carbon dioxide/methane separations.

13. A gas separation membrane as claimed in claim 1 wherein said polyester comprises at least 75 mole percent 2-bromoterephthalates and not more than 25 mole percent 4-bromoterephthalate based on 4,4'-[2,2,2-trifluoro-1-(trifluoromethyl)ethylidene]bis[2,6-dibromophenol] for carbon dioxide/methane separations.

14. A gas separation membrane as claimed in claim 1 wherein said polyester comprises at least 80 mole percent isophthalate and not more than 20 mole percent of terephthalate for membranes based on 1,1- bis(3,5-dibromo-4-hydroxyphenol) cyclododecane for oxygen/nitrogen separations.

15. A gas separation membrane as claimed in claim 1 wherein said polyester comprises at least 70 mole percent terephthalate and not more than 30 mole percent of isophthalate for membranes based on 1,1- bis(3,5-dibromo-4-hydroxyphenyl) cyclododecane for carbon dioxide/methane separations.

16. A gas separation membrane as claimed in claim 1 wherein said tetrabromobisphenol of general formula (I) is 1,1-bis (3,5-dibromo-4-hydroxyphenyl) cyclododecane.

17. A gas separation membrane as claimed in claim 16 wherein said tetrabromobisphenols are a mixture of 1,1-bis (3,5-dibromo-4-hydroxyphenyl) cyclododecane and 4,4'-bis (3,5-dimethyl-4-hydroxyphenyl) cyclododecane.

18. A gas separation membrane as claimed in claim 16 wherein said tetrabromobisphenol are a mixture of 1,1-bis (3,5-dibromo-4-hydroxyphenyl) cyclododecane and 4,4'-[2,2,2-trifluoro-1-(trifluoromethyl) ehtylidene] bis [2,6-dichlorophenol].

19. A gas separation membrane as claimed in claim 1 wherein said tetrabromobisphenol of general formula (I) is a mixture of 1,1-bis (3,5-dibromo-4-hydroxyphenyl) cyclododecane and 4,4'-[2,2,2-trifluoro-1-(trifluoromethyl)ethylidene]bis [2,6-dimethylphenol].

20. A polyester gas separation membrane as claimed in claim 1 wherein the predominant recurring unit of said polyester has the structural formula:

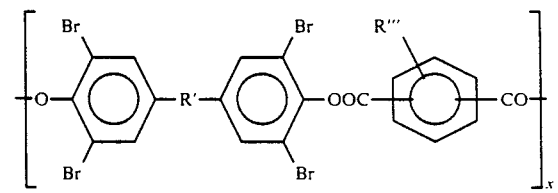

wherein R' is as defined in claim 1, R''' is hydrogen or bromine and x is an integer having a value of at least about 20.

21. A gas separation membrane as claimed in claim 1 wherein said polyester comprises at least 80 mole percent isophthalate and not more than about 20 mole percent terephthalate for membranes based on 4,4'-[2,2,2-trifluoro-1-(trifluoromethyl)ethylidene]bis [2,6-dibromophenol] for oxygen/nitrogen separations.

22. A gas separation membrane as claimed in claim 1 wherein said polyester comprises 75 mole percent terephthalate and 25 mole percent isophthalate for membranes based ion 4,4'-[2,2,2-trifluoro-1-(trifluoromethyl- )ethylidene]bis[2.6-dibromo phenol] for carbon dioxide/methane separations.

23. A gas separation membrane as claimed in claim 1 wherein said polyester comprises 100 mole percent 4-bromoisophthalate based on 4,4'-[2,2,2-trifluoro-1-(trifluoromethyl)ethylidene]bis[2,6-dibromo phenol] for oxygen/nitrogen separations.

24. A process for separating a component from an O₂/N or CO₂/CH₄ gas mixture containing said component which comprises contacting said gas mixture with one side of a gas separation membrane comprising a thin layer consisting predominantly of a polyester or copolyester derived from the reaction of an aromatic dicarboxylic acid or derivative thereof and greater than 50 mole percent of a tetrabromobisphenol of the general formula:

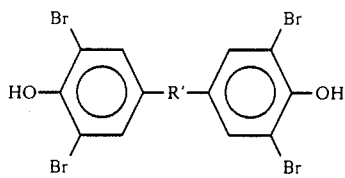

wherein R' is

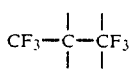

or divalent cyclododecyl and wherein said aromatic dicarboxylic acid or derivative thereof comprises (1) (a) 80 mole percent or more of isophthalic acid or its dichloride and/or 4-bromoisophthalic acid or its dichloride and (b) 20 mole percent or less of terephthalic acid or its dichloride and/or 2-bromoterephthalic acid or its dichloride as the dicarboxylic acid compound, or (2) (a) 30 mole percent or less of isophthaloyl dichloride and/or 4-homoisophthalic acid or its dichloride and (b) 70 mole percent or more of terephthalic acid or its dichloride and/or 2-bromoterephthalic acid or is dichloride; said membrane having a combination of high selectivity and high permeation rate values, while maintaining a pressure differential across the two sides of the membrane and removing the permeated component from the other side of the membrane.

25. A process as claimed in claim 24, wherein said polyester or copolyester is derived essentially from an aromatic acid or derivative thereof and a mixture of diols comprising greater than 50 mole percent of said tetrabromobisphenol (I) and less than 50 mole percent of a bisphenol of the general formula:

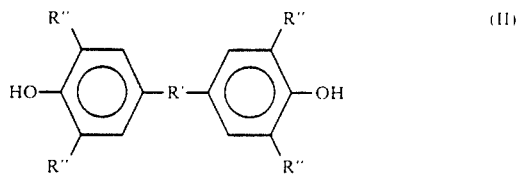

wherein R" is methyl or chlorine.

26. A process as claimed in claim 24, wherein said tetrabromobisphenol (I) comprises at least about 80 mole percent of the mixture of diols.

27. A process as claimed in claim 23 wherein said tetrabromobisphenol (I) comprises 100 mole percent of the bisphenol diols.

28. A process as claimed in claim 23 wherein said gas mixture comprises oxygen and nitrogen.

29. A process as claimed in claim 27 wherein R' of the tetrabromobisphenol (I) is

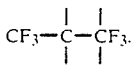

30. A process as claimed in claim 23 wherein said gas mixture comprises air.

31. A process as claimed in claim 23 wherein said gas mixture is a mixture comprising carbon dioxide and methane.

32. A process as claimed in claim 29 wherein R' of the tetrabromobisphenol (I) is·

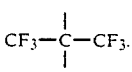

33. A process as claimed in claim 23 wherein R' of the tetrabromobisphenol (I) is

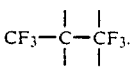

34. A process as claimed in claim 23 wherein the predominent recurring unit of said polyester has the structural formula:

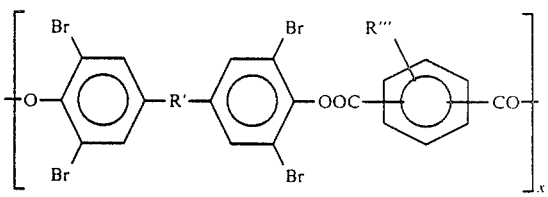

wherein R' is as defined in claim 13. R''' is hydrogen or bromine and x is an integer having a value of at least about 20.

* * * * *